US012657911B2

(12) United States Patent　　　　　(10) Patent No.:　US 12,657,911 B2
Jain　　　　　　　　　　　　　　　　　(45) Date of Patent:　　Jun. 16, 2026

(54) USING USER-TRIGGERED VIDEO RECORDINGS AND/OR USER-EXPORTED VIDEO RECORDINGS AS A BASIS TO IDENTIFY FUTURE VIDEOS OF INTEREST

(71) Applicant: Honeywell International Inc., Charlotte, NC (US)

(72) Inventor: Abhisekh Jain, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 416 days.

(21) Appl. No.: 17/944,132

(22) Filed: Sep. 13, 2022

(65) Prior Publication Data

US 2024/0087315 A1　　Mar. 14, 2024

(51) Int. Cl.
　　*G06V 20/40*　　　(2022.01)
　　*G06V 10/70*　　　(2022.01)
　　　　　　(Continued)

(52) U.S. Cl.
　　CPC ............ *G06V 20/41* (2022.01); *G06V 10/945* (2022.01); *G06V 20/47* (2022.01); *G06V 20/48* (2022.01);
　　　　　　(Continued)

(58) Field of Classification Search
　　CPC ...... G06V 20/41; G06V 10/945; G06V 20/47; G06V 20/48; G06V 10/70; G06V 2201/10;
　　　　　　(Continued)

(56) References Cited

U.S. PATENT DOCUMENTS 9,348,909 B1 *　5/2016　Goikhman ......... H04N 21/4828
9,900,632 B1 *　2/2018　Flores Guerra ..... G06F 16/7867
　　　　　　(Continued)

FOREIGN PATENT DOCUMENTS

CA　　　　2588219 C　　5/2014

OTHER PUBLICATIONS

P. V. V. Kishore, R. Rahul, K. Sravya and A. S. C. S. Sastry, "Crowd Density Analysis and tracking," 2015 International Conference on Advances in Computing, Communications and Informatics (ICACCI), Kochi, India, 2015, pp. 1209-1213, doi: 10.1109/ICACCI.2015. 7275777. (Year: 2015).*

(Continued)

*Primary Examiner* — Henok Shiferaw
*Assistant Examiner* — Dion J Satcher
(74) *Attorney, Agent, or Firm* — Seager, Tufte & Wickhem, LLP

(57)　　　　　ABSTRACT

Video analytics may be performed on user-triggered video recording to generate metadata that describes what was found in the user-triggered video recording. A subsequent video stream may be analyzed, thereby generating metadata associated with the subsequent video stream. The metadata associated with the subsequent video stream may be compared with the metadata associated with the user-triggered recording. When the metadata associated with the subsequent video stream matches the metadata associated one or more of the user-triggered video recordings in accordance with one or more matching criteria, an inquiry is outputted to an operator soliciting whether a user-triggered video recording should be initiated for the subsequent video stream. The method includes receiving from the operator a response to the inquiry indicating whether to initiate a user-triggered video recording of the subsequent video (Continued)

For at least some of the user-triggered video recordings:
Performing video analytics on the corresponding user-triggered video recording to find one or more events, objects and/or characteristics within the corresponding user-triggered video recording ——22a
Generating metadata that corresponds to the one or more events, objects and/or characteristics found within the corresponding user-triggered video recording ——22b
Associating the metadata with the corresponding user-triggered video recording ——22c Receiving a subsequent video stream, wherein for the subsequent video stream:
Performing video analytics on the subsequent video stream to find one or more events, objects and/or characteristics within the subsequent video stream ——24a
Generating metadata that describes the one or more events, objects and/or characteristics found within the subsequent video stream ——24b
Compare the metadata associated with the subsequent video stream to the metadata associated one or more of the user-triggered video recordings ——24c When the metadata associated with the subsequent video stream matches the metadata associated with one or more of the user-triggered video recordings in accordance with one or more matching criteria, outputting an inquiry to an operator soliciting whether a user-triggered video recording should be initiated for the subsequent video stream ——26

Receiving from the operator a response to the inquiry indicating whether to initiate a user-triggered video recording of the subsequent video stream, and if so, initiating a user-triggered video recording of the subsequent video stream ——28 stream, and if so, initiating a user-triggered video recording of the subsequent video stream.

18 Claims, 4 Drawing Sheets

(51) Int. Cl.
   *G06V 10/94*          (2022.01)
   *H04N 5/77*          (2006.01)
(52) U.S. Cl.
   CPC .............. *H04N 5/77* (2013.01); *G06V 10/70* (2022.01); *G06V 2201/10* (2022.01)
(58) Field of Classification Search
   CPC ........ G06V 20/46; G06V 20/44; G06V 20/52; G06V 20/40; H04N 5/77; H04N 5/78; H04N 21/44; H04N 21/4728
   USPC ................................................. 382/159, 382
   See application file for complete search history.

(56) References Cited

U.S. PATENT DOCUMENTS

| | | | | |
|---|---|---|---|---|
| 10,038,872 | B2 * | 7/2018 | Worrill ................... | H04N 7/188 |
| 10,271,111 | B2 | 4/2019 | Stieglitz | |
| 10,412,346 | B1 * | 9/2019 | Yu ......................... | H04L 51/046 |
| 10,438,465 | B1 * | 10/2019 | Bart .......................... | G06T 7/70 |
| 10,750,209 | B1 * | 8/2020 | Edwards ................ | H04N 7/183 |
| 10,868,672 | B1 * | 12/2020 | Farrugia ............... | H04L 9/0861 |
| 10,911,725 | B2 * | 2/2021 | Ross ...................... | H04N 7/183 |
| 10,997,423 | B1 * | 5/2021 | Borras ................... | H04N 23/90 |
| 11,776,271 | B2 * | 10/2023 | Janakiraman .......... | G06V 20/47 |
| | | | | 382/103 |
| 2004/0218904 | A1 | 11/2004 | Yoon et al. | |
| 2016/0286156 | A1 * | 9/2016 | Kovac .................... | G06Q 50/26 |
| 2017/0148488 | A1 | 5/2017 | Li et al. | |
| 2017/0213086 | A1 * | 7/2017 | Cao ........................ | G11B 27/28 |
| 2018/0012078 | A1 * | 1/2018 | Pournaghi ................ | G06T 7/77 |
| 2020/0327313 | A1 * | 10/2020 | Kedarisetti ........... | G06V 20/52 |
| 2020/0364468 | A1 | 11/2020 | Sulzer et al. | |
| 2021/0158048 | A1 * | 5/2021 | Lee ......................... | G06F 18/22 |
| 2022/0222943 | A1 | 7/2022 | Loeshelle | |

OTHER PUBLICATIONS

Extended European Search Report, EP Application No. 23193130.4; European Patent Office, Dec. 4, 2023 (9 pages).
Ma, et al; "A Retrieval Optimized Surveillance Video Storage System for Campus Application," vol. 2018, Article ID 3839104, 10 pages, 2018.
Mei, et al; "Near-Lossless Semantic Video Summarization and Its Applications to Video Analyses," 2012.ACM Trans. Mulitmedia Comput. Commun. Appl. 2,3 Article 1, 23 pages, 2010.

* cited by examiner

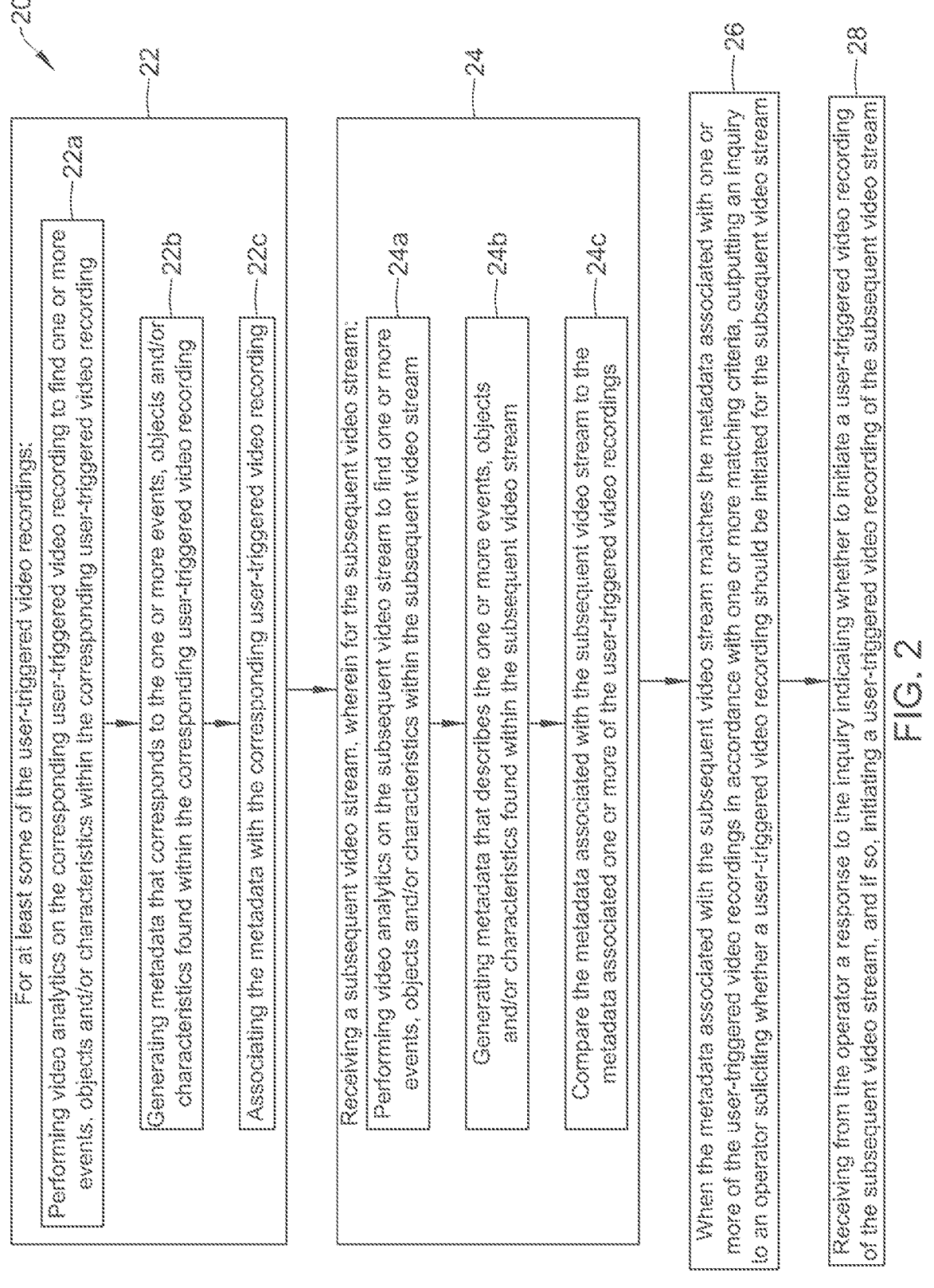

For at least some of the user-triggered video recordings:

Performing video analytics on the corresponding user-triggered video recording to find one or more events, objects and/or characteristics within the corresponding user-triggered video recording — 22a Generating metadata that corresponds to the one or more events, objects and/or characteristics found within the corresponding user-triggered video recording — 22b Associating the metadata with the corresponding user-triggered video recording — 22c

24

Receiving a subsequent video stream, wherein for the subsequent video stream:

Performing video analytics on the subsequent video stream to find one or more events, objects and/or characteristics within the subsequent video stream — 24a Generating metadata that describes the one or more events, objects and/or characteristics found within the subsequent video stream — 24b Compare the metadata associated with the subsequent video stream to the metadata associated one or more of the user-triggered video recordings — 24c When the metadata associated with the subsequent video stream matches the metadata associated with one or more of the user-triggered video recordings in accordance with one or more matching criteria, outputting an inquiry to an operator soliciting whether a user-triggered video recording should be initiated for the subsequent video stream — 26

Receiving from the operator a response to the inquiry indicating whether to initiate a user-triggered video recording of the subsequent video stream, and if so, initiating a user-triggered video recording of the subsequent video stream — 28

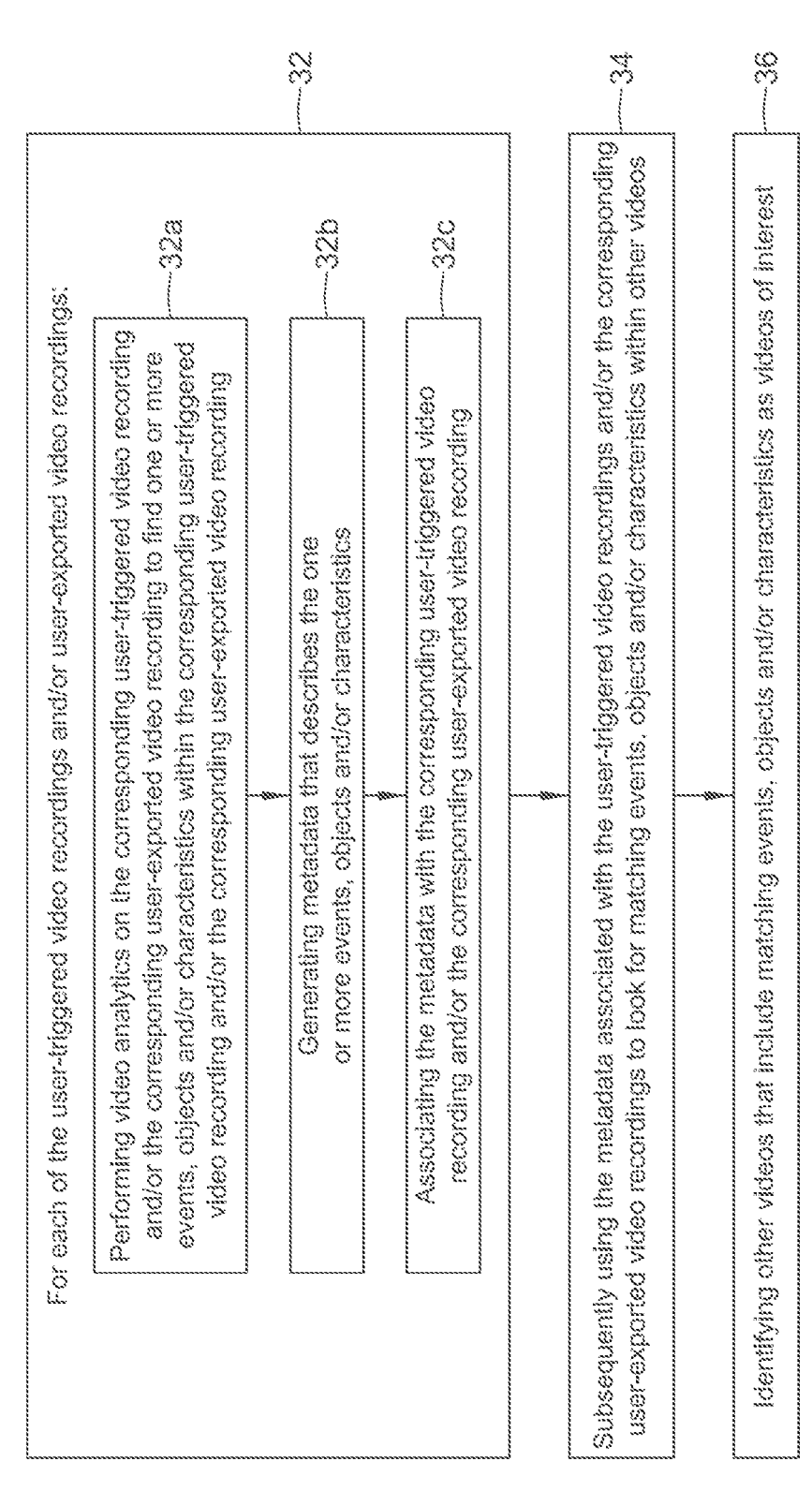

For each of the user-triggered video recordings and/or user-exported video recordings:

32a

Performing video analytics on the corresponding user-triggered video recording and/or the corresponding user-exported video recording to find one or more events, objects and/or characteristics within the corresponding user-triggered video recording and/or the corresponding user-exported video recording 32b Generating metadata that describes the one or more events, objects and/or characteristics 32c Associating the metadata with the corresponding user-triggered video recording and/or the corresponding user-exported video recording

34

Subsequently using the metadata associated with the user-triggered video recordings and/or the corresponding user-exported video recordings to look for matching events, objects and/or characteristics within other videos

36

Identifying other videos that include matching events, objects and/or characteristics as videos of interest

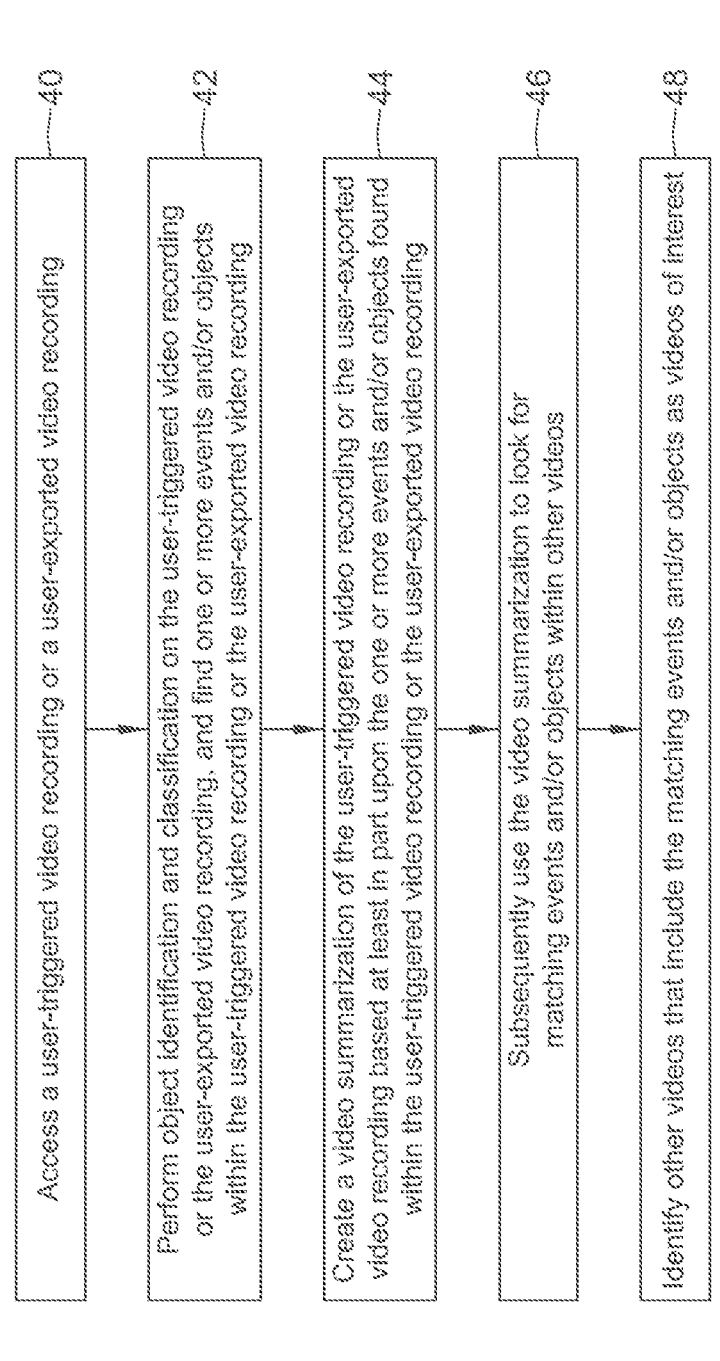

Access a user-triggered video recording or a user-exported video recording — 40

Perform object identification and classification on the user-triggered video recording or the user-exported video recording, and find one or more events and/or objects within the user-triggered video recording or the user-exported video recording — 42

Create a video summarization of the user-triggered video recording or the user-exported video recording based at least in part upon the one or more events and/or objects found within the user-triggered video recording or the user-exported video recording — 44

Subsequently use the video summarization to look for matching events and/or objects within other videos — 46

Identify other videos that include the matching events and/or objects as videos of interest — 48

USING USER-TRIGGERED VIDEO RECORDINGS AND/OR USER-EXPORTED VIDEO RECORDINGS AS A BASIS TO IDENTIFY FUTURE VIDEOS OF INTEREST

TECHNICAL FIELD

The present disclosure relates to video recording, and more particularly, to using user-triggered video recordings as a basis to subsequently identify future videos of interest.

BACKGROUND

Many security systems employ video cameras for capturing video showing a variety of different events. Some video clips may be captured by an operator when the operator believes they saw something at least potentially of interest. In many cases, these video clips may be captured without any context. A video clip captured by an operator may be referred to as a user-triggered video recording. What would be beneficial would be a way to process the user-triggered video recordings and provide a summary of the user-triggered video recordings. What would be beneficial would be a way to add appropriate metadata to the user-triggered video recordings that can be used to search subsequent video streams or video clips for similar events.

SUMMARY

This disclosure relates to relates to video recording, and more particularly, to using user-triggered video recordings as a basis to subsequently identify videos of interest. An example may be found in a method that includes, for at least some of the user-triggered video recordings, performing video analytics on the corresponding user-triggered video recording to find one or more events, objects and/or characteristics within the corresponding user-triggered video recording, generating metadata that corresponds to the one or more events, objects and/or characteristics found within the corresponding user-triggered video recording, and associating the metadata with the corresponding user-triggered video recording. The illustrative method includes receiving a subsequent video stream (e.g. live video stream), and performing several steps in response. The steps include performing video analytics on the subsequent video stream to find one or more events, objects and/or characteristics within the subsequent video stream, generating metadata that describes the one or more events, objects and/or characteristics found within the subsequent video stream, and comparing the metadata associated with the subsequent video stream to the metadata associated one or more of the user-triggered video recordings. When the metadata associated with the subsequent video stream matches the metadata associated one or more of the user-triggered video recordings in accordance with one or more matching criteria, an inquiry is outputted to an operator soliciting whether a user-triggered video recording should be initiated for the subsequent video stream. The illustrative method further includes receiving from the operator a response to the inquiry indicating whether to initiate a user-triggered video recording of the subsequent video stream, and if so, initiating a user-triggered video recording of the subsequent video stream.

Another example may be found in a method for using stored video recordings, at least some of the stored video recordings including user-triggered video recordings and/or user-exported video recordings, to find other videos of interest. The illustrative method includes, for each of the user-triggered video recordings and/or user-exported video recordings, performing video analytics on the corresponding user-triggered video recording and/or the corresponding user-exported video recording to find one or more events, objects and/or characteristics within the corresponding user-triggered video recording and/or the corresponding user-exported video recording, generating metadata that describes the one or more found events, objects and/or characteristics, and associating the metadata with the corresponding user-triggered video recording and/or the corresponding user-exported video recording. The illustrative method further includes subsequently using the metadata associated with the user-triggered video recordings and/or the corresponding user-exported video recordings to look for matching events, objects and/or characteristics within other videos, and identifying other videos (e.g. live videos) that include matching events, objects and/or characteristics as videos of interest.

Another example may be found in a non-transitory, computer readable storage medium having instructions stored thereon. When the instructions are executed by one or more processors, the one or more processors are caused to access a user-triggered video recording or a user-exported video recording, perform object identification and classification on the user-triggered video recording or the user-exported video recording, and find one or more events and/or objects within the user-triggered video recording or the user-exported video recording, and create a video summarization of the user-triggered video recording or the user-exported video recording based at least in part upon the one or more events and/or objects found within the user-triggered video recording or the user-exported video recording. The one or more processors are caused to subsequently use the video summarization to look for matching events and/or objects within other videos (e.g. live videos), and to identify other videos that include the matching events and/or objects as videos of interest.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 2 is a flow diagram showing an illustrative method for using user-triggered video recordings to find subsequent video streams of interest;

FIG. 3 is a flow diagram showing an illustrative method for using stored video recordings to find other videos of interest; and FIG. 4 is a flow diagram showing an illustrative series of steps that may be carried out by one or more processors when the one or more processors execute a set of executable instructions.

Figure 1:
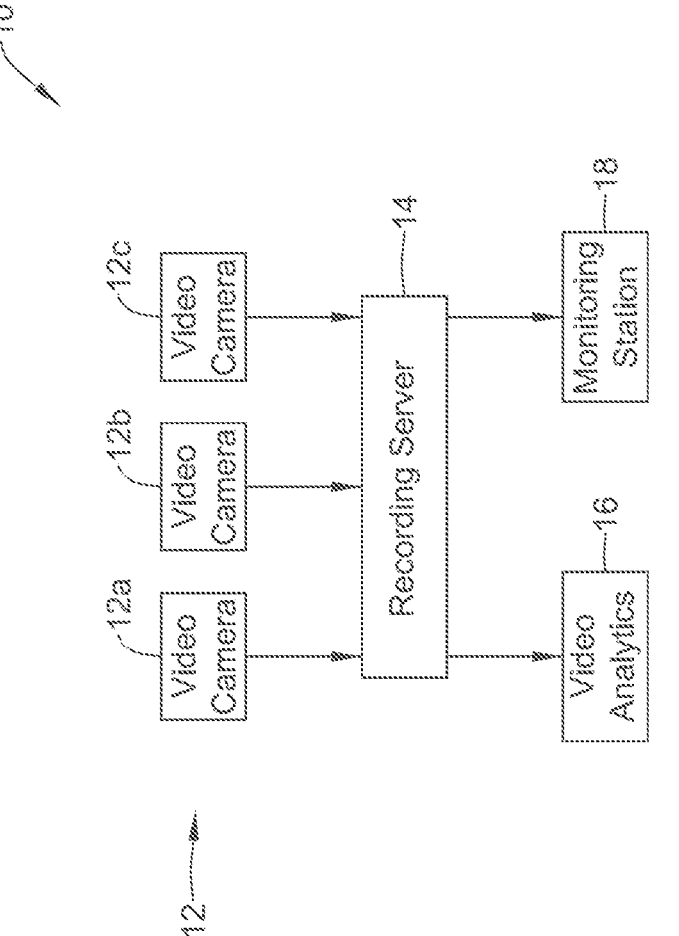
FIG. 1 is a schematic block diagram showing an illustrative video system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative video system 10. The illustrative video system 10 includes a number of video cameras 12, individually labeled as 12a, 12b and 12c. While a total of three video cameras 12 are shown, it will be appreciated that this is merely illustrative, as the video system 10 may include any number of video cameras 12, and in some cases the video system 10 may include tens, hundreds or even thousands of video cameras 12. The video system 10 includes a server, such as a recording server 14, that receives the video streams provided by the video cameras 12a-12c, and records selected video streams provided by the video cameras 12. The recording server 14 may be a desktop computer, for example. The recording server 14 may be a networked and/or cloud-based server in some cases. The recording server 14 may be distributed, sometimes with part of the recording server located local to the video camera(s), such as at the edge, and part of the recording server located at a remote location such as in the cloud. These are just examples.

In the example shown, the recording server 14 may be configured to provides some or all of the video streams from the video cameras 12a-12c and the previously recorded video clips to a video analytics service 16. In some cases, the video analytics service 16 may be a standalone computer or computer server. In some cases, the video analytics service 16, or at least some functionality thereof, may be incorporated into the recording server 14. The video analytics service 16, or at least some functionality thereof, may be incorporated into the monitoring station 18. In some cases, the video analytics service 16 may be distributed with part of the video analytics service 16 hosted local to the video camera(s), such as at the edge, and part of the video analytics service 16 hosted remote from the video camera(s), such as in the cloud. These are just examples. The video analytics service 16 may be configured to analyze live video streams to determine metadata that describes what is being seen in the live video streams.

A monitoring station 18 may have access to some or all of the video streams from the video cameras 12a-12c and to the previously recorded video clips. An operator watching video streams via the monitoring station 18 may decide that a particular video stream includes an event of potential interest, and may initiate what is known as a user-triggered recording.

The video analytics service 16 may be configured to analyze previously recorded video clips or video streams, including those known as user-triggered video recordings, to determine metadata that describes what is being seen in the user-triggered video recordings. The video analytics service 16 may be configured to analyze live video streams to determine metadata that describes what is being seen in the live video streams. The video analytics service 16, or the recording server 14, may be configured to compare the metadata that is associated with the user-triggered video recordings with the metadata that is associated with the live video streams in order to look for similar events in the live video streams. If a similar event is found in one of the live video streams, the live video stream may be displayed via the monitoring station 18 for an operator to determine whether it is of interest, and if it is, may query whether the operator wishes to initiate a user-triggered recording of the live video stream.

FIG. 2 is a flow diagram showing an illustrative method 20 for using user-triggered video recordings to find subsequent video streams of interest. The method 20 includes performing several steps for at least some of the user-triggered video recordings, as indicated at block 22. The steps include performing video analytics on the corresponding user-triggered video recording to find one or more events, objects and/or characteristics within the corresponding user-triggered video recording, as indicated at block 22a. This may include performing object classification. The one or more events, objects and/or characteristics may include one or more of a person, one or more facial characteristics of a detected person suitable for facial recognition, one or more clothing characteristics of a detected person, an animal, a gender, an estimated age, an overall number of people, a crowd density, a vehicle, an inanimate object, an interaction between two or more inanimate objects, an interaction between a person and an inanimate object, an interaction between two or more persons, a behavior exhibited by one or more person, a velocity of one or more persons, a velocity of one or more inanimate objects, a time of day that the video was captured, an activity detected in a predefined region of interest, a presence of smoke, a presence of flame, a noise, a noise level, a scream, a poor video characteristic/quality (e.g. blurry, at least partially blocked, too dark, too light, not stable), and/or any other suitable event, object and/or characteristic. The steps include generating metadata that corresponds to the one or more events, objects and/or characteristics found within the corresponding user-triggered video recording, as indicated at block 22b. The steps include associating the metadata with the corresponding user-triggered video recording, as indicated at block 22c.

A subsequent video stream is received, and for the subsequent video streams several steps are carried out, as indicated at block 24. In some cases, the subsequent video stream may be a live video stream. In some cases, the subsequent video stream may be a recorded video stream. The steps include performing video analytics on the subsequent video stream to find one or more events, objects and/or characteristics within the subsequent video stream, as indicated at block 24*a*. In some cases, and to increase the speed of identifying one or more events, objects and/or characteristics within the subsequent video stream, the video analytics may be performed only on key frames of the subsequent video stream, such on key frames (1 key frame of 30 frames/second). In some cases, the video analytics may be performed only on I-frames, P-Frames and/or Delta-Frames of the subsequent video stream. In some cases, the video analytics may be performed on all frames of the subsequent video stream.

The steps further include generating metadata that describes the one or more events, objects and/or characteristics found within the subsequent video stream, as indicated at block 24*b*. The steps include comparing the metadata associated with the subsequent video stream to the metadata associated one or more of the user-triggered video recordings, as indicated at block 24*c*. In one example, when the metadata associated with the subsequent video stream matches the metadata associated with one or more of the user-triggered video recordings in accordance with one or more matching criteria, an inquiry is outputted to an operator soliciting whether a user-triggered video recording should be initiated for the subsequent video stream, as indicated at block 26. In some cases, the one or more matching criteria may include one or more matching events, objects and/or characteristics. The one or more matching criteria may include a combination of two or more matching events, objects and/or characteristics, for example. In some cases, the one or more matching criteria may include a one or more matching events and/or objects detected during a matching time period during a day. At least some of the one or more of the matching criteria are learned over time using machine learning. In some cases, the metadata associated with the subsequent video stream is compared to the metadata associated one or more of the user-triggered video recordings on an on-going basis using a crawler, spider or spiderbot. A response to the inquiry indicating whether to initiate a user-triggered video recording of the subsequent video stream is received from the operator, and if so, initiating a user-triggered video recording of the subsequent video stream, as indicated at block 28.

In another example, when the metadata associated with the subsequent video stream matches the metadata associated one or more of the user-triggered video recordings in accordance with one or more matching criteria, the system automatically initiates recording of the subsequent video stream. In some cases, the operator may be queried to confirm the recording, but this is not required.

FIG. 3 is a flow diagram showing an illustrative method 30 for using stored video recordings, at least some of the stored video recordings including user-triggered video recordings and/or user-exported video recordings, to find other videos of interest (e.g. live videos of interest). The illustrative method 30 includes carrying out several steps for each of the user-triggered video recordings and/or user-exported video recordings, as indicated at block 32. The steps include performing video analytics on the corresponding user-triggered video recording and/or the corresponding user-exported video recording to find one or more events, objects and/or characteristics within the corresponding user-triggered video recording and/or the corresponding user-exported video recording, as indicated at block 32*a*. In some cases, performing video analytics may include identifying one or more objects and classifying one or more of the identified objects into one of a plurality of object classifications. The steps include generating metadata that describes the one or more found events, objects and/or characteristics, as indicated at block 32*b*. The steps include associating the metadata with the corresponding user-triggered video recording and/or the corresponding user-exported video recording, as indicated at block 32*c*.

The illustrative method 30 includes subsequently using the metadata associated with the user-triggered video recordings and/or the corresponding user-exported video recordings to look for matching events, objects and/or characteristics within other videos, as indicated at block 34. The method 30 includes identifying other videos that include matching events, objects and/or characteristics as videos of interest, as indicated at block 36. At least some of the other videos may include live-streaming videos. At least some of the other videos may include a previously recorded video. In some cases, at least part of the videos of interest may be displayed for review by an operator.

FIG. 4 is a flow diagram showing a series of steps 38 that may be carried out by one or more processors executing a set of executable instructions that are storable on a non-transitory, computer-readable storage medium. The one or more processors may be part of the recording server 14. The one or more processors may be part of the video analytics service 16. The one or more processors may be part of the monitoring station 18, or a combination of the recording server 14, the video analytics service 16 and/or monitoring station 18. When the executable instructions are executed by the one or more processors, the one or more processors are caused to access a user-triggered video recording or a user-exported video recording, as indicated at block 40. The one or more processors are caused to perform object identification and classification on the user-triggered video recording or the user-exported video recording, and find one or more events and/or objects within the user-triggered video recording or the user-exported video recording, as indicated at block 42. The one or more processors are caused to create a video summarization (e.g. metadata) of the user-triggered video recording or the user-exported video recording based at least in part upon the one or more events and/or objects found within the user-triggered video recording or the user-exported video recording, as indicated at block 44. The one or more processors are caused to subsequently use the video summarization to look for matching events and/or objects within other videos, as indicated at block 46. The one or more processors are caused to identify other videos that include the matching events and/or objects as videos of interest, as indicated at block 48.

In some cases, at least one of the other videos include a live-streaming video. In some cases, at least one of the other videos include a previously recorded video. Events and or objects found in the other videos may be considered matching events and/or objects when they meet one or more matching criteria. In some cases, at least some of the matching criteria may be learned using machine learning. As an example, the one or more matching criteria may include one or more matching events and/or objects detected during a matching time period during a day, and/or a learned combination of matching events and/or objected. In some cases, the video summarization may include text and/or speech.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for using user-triggered video recordings to find subsequent video streams of interest, the method comprising:

for at least some of the user-triggered video recordings:

performing video analytics on the corresponding user-triggered video recording to find one or more events, objects and/or characteristics within the corresponding user-triggered video recording;

generating metadata that corresponds to the one or more events, objects and/or characteristics found within the corresponding user-triggered video recording, including a time of day that the corresponding event, object and/or characteristic was captured in the respective video recording;

associating the metadata with the corresponding user-triggered video recording;

receiving a subsequent video stream, wherein for the subsequent video stream:

performing video analytics on the subsequent video stream to find one or more events, objects and/or characteristics within the subsequent video stream;

generating metadata that describes the one or more events, objects and/or characteristics found within the subsequent video stream, including a time of day that the corresponding event, object and/or characteristic was captured in the subsequent video stream;

compare the metadata associated with the subsequent video stream to the metadata associated one or more of the user-triggered video recordings;

when the metadata associated with the subsequent video stream matches the metadata associated one or more of the user-triggered video recordings in accordance with one or more matching criteria, outputting an inquiry to an operator soliciting from the operator whether a user-triggered video recording should be initiated for the subsequent video stream, wherein the one or more matching criteria comprise a matching time of day that the respective one or more events, objects and/or characteristics were captured; and receiving from the operator a response to the inquiry indicating whether to initiate a user-triggered video recording of the subsequent video stream, and if so, initiating a user-triggered video recording of the subsequent video stream, and if not, not initiating a user-triggered video recording of the subsequent video stream.

2. The method of claim 1, wherein the subsequent video stream comprises a live-video stream.

3. The method of claim 1, wherein the one or more events, objects and/or characteristics comprise one or more of:

one or more facial characteristics of a detected person suitable for facial recognition;

one or more clothing characteristics of a detected person;

a gender;

an estimated age;

an overall number of people;

a crowd density;

an interaction between two or more inanimate objects;

an interaction between a person and an inanimate object;

a presence of smoke;

a presence of flame;

a noise;

a noise level;

a scream; and a video characteristic of being blurry, at least partially blocked, too dark, too light, or not stable.

4. The method of claim 3, wherein the one or more matching criteria comprise one or more matching events, objects and/or characteristics.

5. The method of claim 3, wherein the one or more matching criteria comprise a combination of two or more matching events, objects and/or characteristics.

6. The method of claim 1, wherein one or more of the matching criteria are learned over time using machine learning.

7. The method of claim 1, wherein the metadata associated with the subsequent video stream is compared to the metadata associated one or more of the user-triggered video recordings using a crawler.

8. The method of claim 1, wherein the one or more events, objects and/or characteristics comprise an overall number of people.

9. The method of claim 1, wherein the one or more events, objects and/or characteristics comprise an interaction between a person and an inanimate object.

10. The method of claim 1, wherein the one or more events, objects and/or characteristics comprise a presence of smoke or a presence of flame.

11. The method of claim 1, wherein the one or more events, objects and/or characteristics comprise a noise level.

12. The method of claim 1, wherein the one or more events, objects and/or characteristics comprise a video characteristic of being blurry, at least partially blocked, too dark, too light, or not stable.

13. A method for using stored video recordings, at least some of the stored video recordings including user-triggered video recordings and/or user-exported video recordings, to find other videos of interest, the method comprising:

for each of the user-triggered video recordings and/or user-exported video recordings:

performing video analytics on the corresponding user-triggered video recording and/or the corresponding user-exported video recording to find one or more events, objects and/or characteristics within the corresponding user-triggered video recording and/or the corresponding user-exported video recording;

generating metadata that describes the one or more found events, objects and/or characteristics, including a time of day that the corresponding event, object and/or characteristic was captured in the respective video recording;

associating the metadata with the corresponding user-triggered video recording and/or the corresponding user-exported video recording;

receiving a subsequent video stream, wherein for the subsequent video stream:

performing video analytics on the subsequent video stream to find one or more events, objects and/or characteristics within the subsequent video stream;

generating metadata that describes the one or more events, objects and/or characteristics found within the subsequent video stream, including a time of day that the corresponding event, object and/or characteristic was captured in the subsequent video stream;

compare the metadata associated with the subsequent video stream to the metadata associated one or more of the user-triggered video recordings and/or one or more user-exported video recordings;

when the metadata associated with the subsequent video stream matches the metadata associated one or more of the user-triggered video recordings and/or one or more user-exported video recordings in accordance with one or more matching criteria, outputting an inquiry to an operator soliciting from the operator whether a user-triggered video recording should be initiated for the subsequent video stream, wherein the one or more matching criteria include a matching time of day that the respective one or more events, objects and/or characteristics were captured; and receiving from the operator a response to the inquiry indicating whether to initiate a user-triggered video recording of the subsequent video stream, and if so, initiating a user-triggered video recording of the subsequent video stream, and if not, not initiating a user-triggered video recording of the subsequent video stream.

14. The method of claim 13, wherein at least one of the other videos comprise a live-streaming video.

15. The method of claim 13, wherein at least one of the other videos comprise a previously recorded video.

16. The method of claim 13, further comprising displaying at least part of the videos of interest for review by an operator.

17. The method of claim 13, wherein performing video analytics comprises identifying one or more objects and classifying one or more of the identified objects into one of a plurality of object classifications.

18. A method for using user-triggered video recordings to find subsequent video streams of interest, the method comprising:

for at least some of the user-triggered video recordings:

performing video analytics on the corresponding user-triggered video recording to find one or more events, objects and/or characteristics within the corresponding user-triggered video recording;

generating metadata that corresponds to the one or more events, objects and/or characteristics found within the corresponding user-triggered video recording;

associating the metadata with the corresponding user-triggered video recording;

receiving a subsequent video stream, wherein for the subsequent video stream:

performing video analytics on the subsequent video stream to find one or more events, objects and/or characteristics within the subsequent video stream;

generating metadata that describes the one or more events, objects and/or characteristics found within the subsequent video stream;

compare the metadata associated with the subsequent video stream to the metadata associated one or more of the user-triggered video recordings;

when the metadata associated with the subsequent video stream matches the metadata associated one or more of the user-triggered video recordings in accordance with one or more matching criteria, outputting an inquiry to an operator soliciting from the operator whether a user-triggered video recording should be initiated for the subsequent video stream, wherein the one or more matching criteria comprise a crowd density; and receiving from the operator a response to the inquiry indicating whether to initiate a user-triggered video recording of the subsequent video stream, and if so, initiating a user-triggered video recording of the subsequent video stream, and if not, not initiating a user-triggered video recording of the subsequent video stream.

* * * * *